United States Patent
Tamaki

(10) Patent No.: US 12,445,587 B2
(45) Date of Patent: Oct. 14, 2025

(54) CONTROL APPARATUS, ELECTRONIC APPARATUS, CONTROL METHOD, AND STORAGE MEDIUM

(71) Applicant: CANON KABUSHIKI KAISHA, Tokyo (JP)

(72) Inventor: Yoshihito Tamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 18/165,020

(22) Filed: Feb. 6, 2023

(65) Prior Publication Data
US 2023/0254471 A1   Aug. 10, 2023

(30) Foreign Application Priority Data

Feb. 9, 2022   (JP) ................. 2022-019126

(51) Int. Cl.
*H04N 13/296* (2018.01)
*H04N 13/239* (2018.01)
*H04N 13/344* (2018.01)
*H04N 23/67* (2023.01)
*H04N 23/71* (2023.01)

(52) U.S. Cl.
CPC ......... *H04N 13/296* (2018.05); *H04N 13/239* (2018.05); *H04N 13/344* (2018.05); *H04N 23/672* (2023.01); *H04N 23/71* (2023.01)

(58) Field of Classification Search
CPC .. H04N 13/296; H04N 13/239; H04N 13/344; H04N 23/672; H04N 23/71
See application file for complete search history.

(56) References Cited

U.S. PATENT DOCUMENTS

| | | | |
|---|---|---|---|
| 2011/0134282 A1* | 6/2011 | Morita | G02B 3/0043 348/222.1 |
| 2012/0242881 A1* | 9/2012 | Suzuki | H04N 23/67 348/E5.045 |
| 2013/0050439 A1* | 2/2013 | Nakamura | H04N 13/30 348/E13.008 |
| 2017/0252216 A1* | 9/2017 | Maeda | H04N 13/398 |
| 2021/0058604 A1* | 2/2021 | Nakata | G03B 17/56 |

FOREIGN PATENT DOCUMENTS

JP   2014-182360 A   9/2014

* cited by examiner

Primary Examiner — Alazar Tilahun
(74) Attorney, Agent, or Firm — Cowan, Liebowitz & Latman, P.C.

(57) ABSTRACT

A control apparatus includes an acquiring unit configured to acquire a first signal acquired by a first image sensor that receives a light beam that has passed through a first optical system, and a second signal acquired by a second image sensor that receives a light beam that has passed through a second optical system disposed so that the first optical system and the second optical system have a parallax, a focus detecting unit configured to provide focus detection using the first signal, and an image generating unit configured to generate a display image to be displayed on a display unit based on at least one of the first signal and the second signal. The focus detecting unit changes a first acquiring range of the first signal on an imaging plane of the first image sensor according to a luminance in an imaging environment.

20 Claims, 8 Drawing Sheets

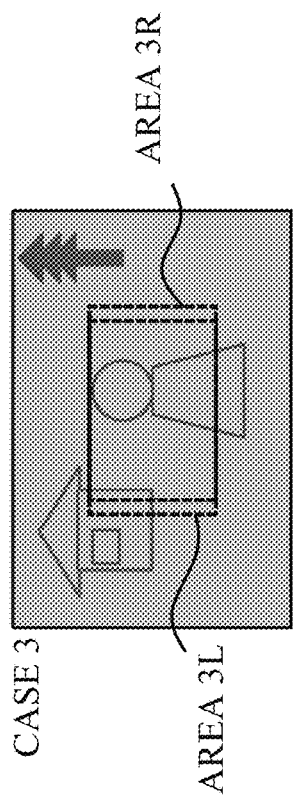
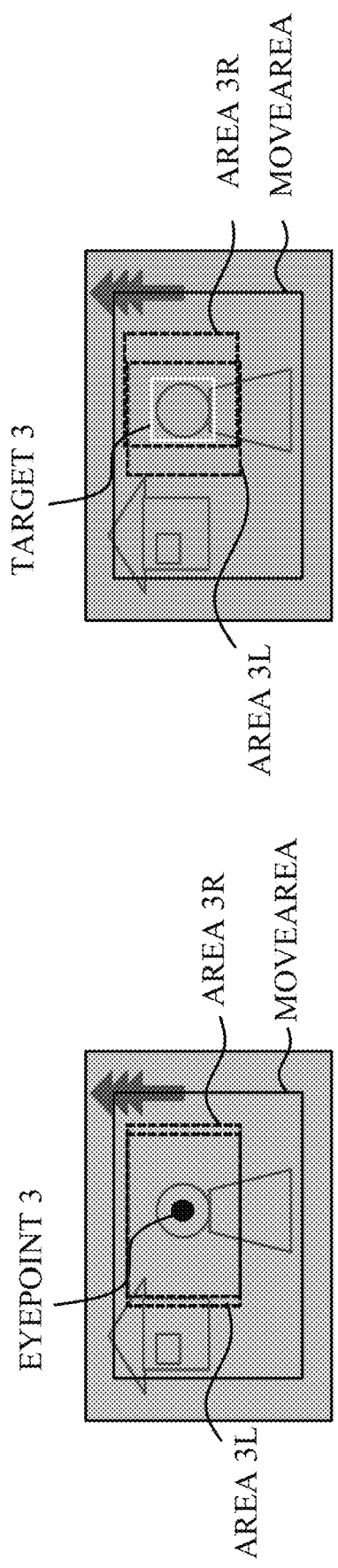
FIG. 7A
FIG. 7B
FIG. 7C

CONTROL APPARATUS, ELECTRONIC APPARATUS, CONTROL METHOD, AND STORAGE MEDIUM

BACKGROUND

Technical Field

One of the aspects of the disclosure relates to a control apparatus, an electronic apparatus, a control method, and a storage medium.

Description of the Related Art

A stereoscopic vision displaying apparatus that captures an image on a real-time basis and displays three-dimensional information have recently been widespread. In addition, there is known an image pickup apparatus that performs focus detection of a pupil dividing method using an image sensor that includes a microlens for each of two-dimensionally arranged pixels (see Japanese Patent Laid-Open No. ("JP") 2014-182360).

In a case where the stereoscopic vision displaying apparatus captures an image utilizing the focus detecting method of the image pickup apparatus disclosed in JP 2014-182360, it is conceivable to increase the sensitivity of the image sensor or to increase the accumulation time for scenes where the luminance is low around the user. Among them, the method of increasing the accumulation time in the dark place may result in a low display rate of a display image and thus low usability because an acquiring interval of the display image becomes longer.

SUMMARY

One of the aspects of the disclosure provides a control apparatus that can properly execute image display and focus detection while suppressing deterioration of usability according to luminance in an imaging environment.

A control apparatus according to one aspect of the disclosure includes at least one processor, and a memory coupled to the at least one processor, the memory having instructions that, when executed by the processor, perform operations as an acquiring unit configured to acquire a first signal acquired by a first image sensor that receives a light beam that has passed through a first optical system, and a second signal acquired by a second image sensor that receives a light beam that has passed through a second optical system disposed so that the first optical system and the second optical system have a parallax, a focus detecting unit configured to provide focus detection using the first signal, and an image generating unit configured to generate a display image to be displayed on a display unit based on at least one of the first signal and the second signal. The focus detecting unit changes a first acquiring range of the first signal on an imaging plane of the first image sensor according to a luminance in an imaging environment. An electronic apparatus including the above control apparatus, a control method corresponding to the above control apparatus, and a storage medium storing a computer program for causing a computer to execute the above control method also constitute another aspect of the disclosure.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, in a case where executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

BRIEF DESCRIPTION OF THE DRAWINGS

FIGS. 7A to 7C explain a method for changing a position and range of the focus detection acquiring range according to the luminance in the imaging environment.

DESCRIPTION OF THE EMBODIMENTS

Figure 1A:
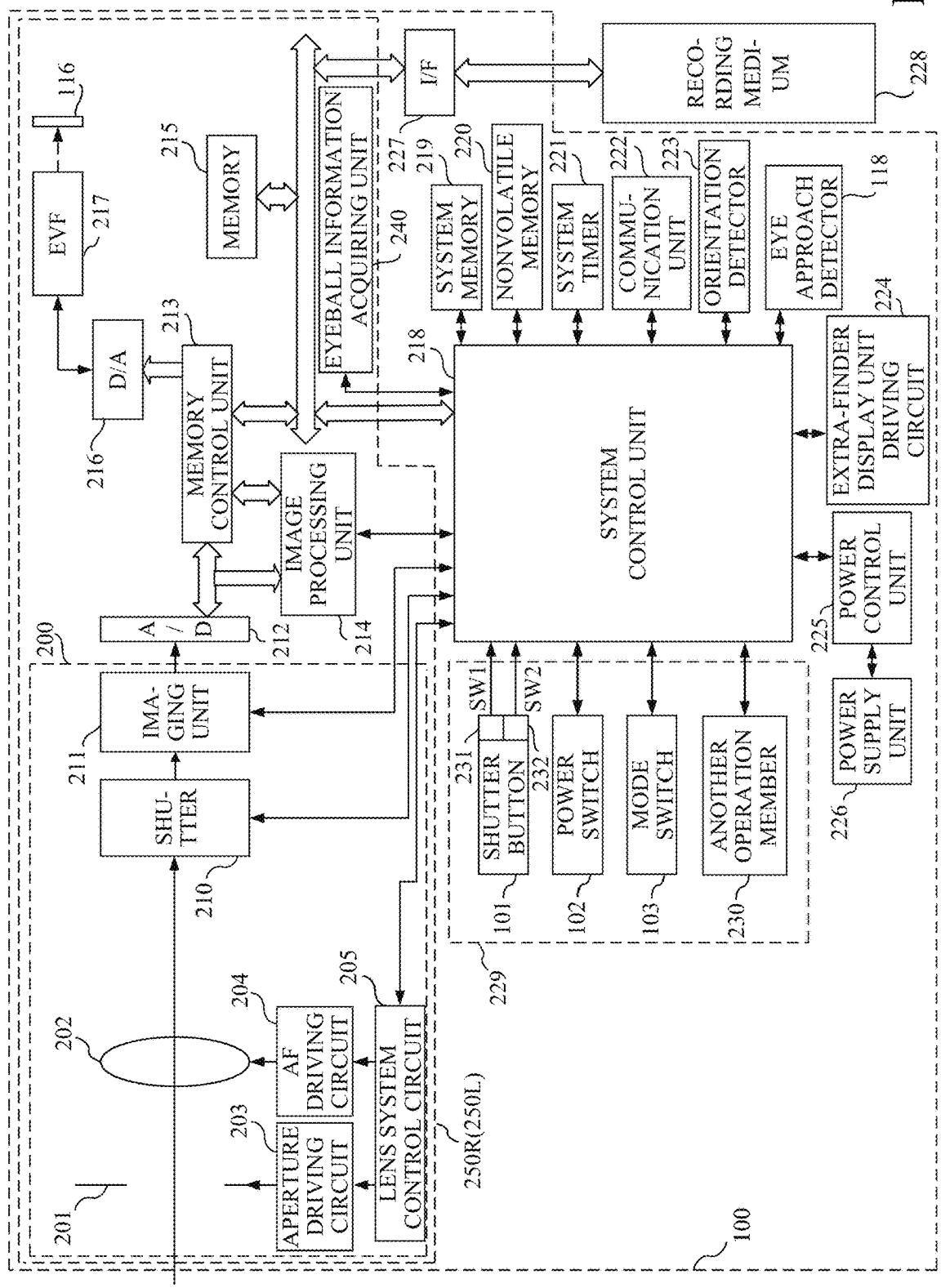
FIGS. 1A and 1B illustrate a configuration example of a head mount display (HMD) as an example of an electronic apparatus according to an embodiment of the disclosure.

Referring now to the accompanying drawings, a detailed description will be given of embodiments according to the disclosure. Corresponding elements in respective figures will be designated by the same reference numerals, and a duplicate description thereof will be omitted.

Configuration of Head Mount Display

FIG. 1A illustrates a configuration example of a head mount display (HMD) (stereoscopic image pickup apparatus) 100 as an example of an electronic apparatus according to an embodiment of the disclosure. The HMD 100 includes a right-eye imaging/display unit 250R and a left-eye imaging/display unit 250L. The HMD 100 further includes a system control unit 218, a system memory 219, a nonvolatile memory 220, a system timer 221, a communication unit 222, an orientation detector 223, and an eye approach detector 118. The HMD 100 further includes an extra-finder display driving circuit 224, a power control unit 225, a power supply unit 226, a recording medium interface (I/F) 227, and an operation unit 229.

The right-eye imaging/display unit 250R includes an image capturing unit 200, an A/D converter 212, a memory control unit 213, an image processing unit 214, a memory 215, a D/A converter 216, an electronic viewfinder (EVF) (display unit) 217, and an eyepiece unit 116, and an eyeball information acquiring unit 240.

The image capturing unit 200 includes an aperture stop (diaphragm) 201, a lens 202, an aperture driving circuit 203, an autofocus (AF) driving circuit 204, a lens system control circuit 205, a shutter 210, and an imaging unit 211. The aperture stop 201 is configured so that an aperture diameter is adjustable. The lens 202 includes a plurality of lenses including a focus lens. The aperture driving circuit 203 adjusts a light amount by controlling the aperture diameter of the aperture stop 201. The AF driving circuit 204 drives the focus lens for focusing. The lens system control circuit 205 controls the aperture driving circuit 203 and the AF driving circuit 204 based on an instruction from the system control unit 218. The lens system control circuit 205 controls the aperture stop 201 via the aperture driving circuit 203 and displaces the position of the focus lens via the AF driving circuit 204 for focusing. The shutter 210 is a focal plane shutter that controls the exposure time of the imaging unit 211 based on an instruction from the system control unit 218. The imaging unit 211 includes an image sensor, such as a CCD, a CMOS device, or the like that converts an optical image into an electrical signal. The imaging unit 211 may include an imaging-plane phase-difference sensor that outputs defocus amount information to the system control unit 218.

The A/D converter 212 converts an analog signal output from the imaging unit 211 into a digital signal. The image processing unit 214 performs predetermined processing (pixel interpolation, resizing such as reduction, color conversion, etc.) for data from the A/D converter 212 or data from the memory control unit 213. The image processing unit 214 performs predetermined calculation processing using image data. The system control unit 218 performs through-the-lens (TTL) AF processing, auto-exposure (AE) processing, electronic flash pre-emission (EF) processing, and the like based on the obtained calculation result. The image processing unit 214 performs predetermined calculation processing using the image data, and performs AWB (Auto White Balance) processing of the TTL method based on the obtained calculation result. Image data from the A/D converter 212 is written in the memory 215 via the image processing unit 214 and the memory control unit 213 or via the memory control unit 213 without the image processing unit 214. The memory 215 stores a predetermined number of still images, a moving image and audio data for a predetermined time. More specifically, the memory 215 stores image data obtained by the imaging unit 211 and converted into digital data by the A/D converter 212 and image data (display image) to be displayed on the EVF 217. The memory 215 also serves as an image displaying memory (video memory). The D/A converter 216 converts image display data stored in the memory 215 into an analog signal and supplies the analog signal to the EVF 217. Therefore, the image data for display written in the memory 215 is displayed on the EVF 217 via the D/A converter 216. The EVF 217 is, for example, a display such as an LCD (liquid crystal display) or an organic EL, and performs display according to the analog signal from the D/A converter 216. A digital signal A/D-converted by the A/D converter 212 and stored in the memory 215 is converted into an analog signal by the D/A converter 216, and transferred to the EVF 217 for display, thereby performing live-view display.

The eyeball information acquiring unit 240 first acquires the eyeball image data of the user, calculates visual line information from the acquired eyeball image data, and sends the calculated visual line information to the system control unit 218. The system control unit 218 uses the visual line information and calculates an focus detection acquiring range according to the luminance in the imaging environment, which will be described below.

The left-eye imaging/display unit 250L has a configuration similar to that of the right-eye imaging/display unit 250R described above, so a detailed description thereof will be omitted in this embodiment.

Figure 1B:
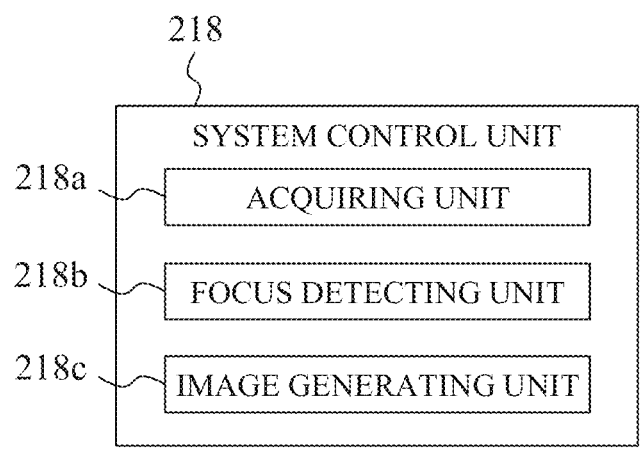

The system control unit 218 includes at least one processor and/or at least one circuit. That is, the system control unit 218 may be a processor, a circuit, or a combination of a processor and a circuit. The system control unit 218 functions as a control apparatus that controls the entire HMD 100. As illustrated in FIG. 1B, the system control unit 218 includes an acquiring unit 218a, a focus detecting unit 218b, and an image generating unit 218c, and executes the programs recorded in the nonvolatile memory 220 to implement each processing of the flowcharts described below. The acquiring unit 218a acquires a first signal acquired by an image sensor (first image sensor) included in one imaging unit 211 that receives a light beam that has passed through one lens 202 (first optical system) in the right-eye imaging/display unit 250R and the left-eye imaging/display unit 250L. The acquiring unit 218a acquires a second signal acquired by an image sensor (second image sensor) included in the other imaging unit 211 that receives a light beam that has passed through the other lens 202 (second optical system) in the right-eye imaging/display unit 250R and the left-eye imaging/display unit 250L. The focus detecting unit 218b performs focus detection using at least one of the first signal and the second signal. The focus detecting unit 218b changes the acquiring range of at least one of the first signal and the second signal according to the luminance in the imaging environment. The image generating unit 218c generates image data to be displayed on the EVF 217 based on at least one of the first signal and the second signal. The system control unit 218 also performs display control by controlling the memory 215, the D/A converter 216, the EVF 217, and the like.

A RAM, for example, is used for the system memory 219. Constants and variables for operations of the system control unit 218, programs read out of the nonvolatile memory 220, and the like are developed in the system memory 219. The nonvolatile memory 220 is an electrically erasable/recordable memory such as an EEPROM. Constants, programs, and the like for operations of the system control unit 218 are recorded in the nonvolatile memory 220. The programs here are programs for executing flowcharts to be described below. The system timer 221 measures the time for a variety of controls and the time of the built-in clock. The communication unit 222 transmits and receives video and audio signals to and from an external device connected wirelessly or by a wired cable. The communication unit 222 can be connected to a wireless Local Area Network (LAN) and the Internet. The communication unit 222 can communicate with an external device using Bluetooth (registered trademark) or Bluetooth Low Energy. The communication unit 222 can transmit images (including live images) captured by the imaging unit 211 and images recorded in the recording medium 228, and can receive image data and other various information from external devices. The orientation detector 223 is, for example, an acceleration sensor or a gyro sensor, and detects the orientation of the HMD 100 relative to the gravity direction. The system control unit 218 determines whether the image captured by the imaging unit 211 is an image captured with the horizontally held HMD 100 or an image captured with the vertically held HMD 100 based on the orientation detected by the orientation detector 223. In addition, the system control unit 218 can add orientation information corresponding to the orientation detected by the orientation detector 223 to the image file of the image captured by the imaging unit 211, or rotate and record the image. The system control unit 218 can detect the motion of the HMD 100 (pan, tilt, lift, whether it is stationary, etc.) based on the orientation detected by the orientation detector 223.

The eye approach detector 118 is a sensor such as an infrared proximity sensor that can detect a state that can be regarded as approaching (eye contact), and can detect the approach (eye approach) of an object (eye) to the eyepiece unit 116 and the separation (departure or eye separation) from the object. In a case where an object approaches the eyepiece unit 116, the infrared rays projected from a light projector of the eye approach detector 118 are reflected on the object and received by a light receiver of the eye approach detector 118. The eye approach detector 118 can determine the distance from the eyepiece unit 116 to the object based on the received infrared light amount. In a case where an object approaching the eyepiece unit 116 within a predetermined distance from the eyepiece unit 116 is detected from the non-approach state, the eye approach detector 118 detects the approach of the object. On the other hand, the eye approach detector 118 detects the separation (eye separation or departure) of the eye (object) in a case where the object whose approach has been detected moves away from the eye approach state (approaching state) by a predetermined distance or more. A threshold for detecting the approach of the object (eye approach) and a threshold for detecting the separation of an object (eye separation) may be equal or different, for example, by providing hysteresis. It is assumed that after the approach of the object (eye approach) is detected, the eye approach detector 118 continues to detect the object approaching state until the separation is detected. It is assumed that after the separation of the object is detected, the eye approach detector 118 continues to detect the object non-approaching state until the approach is detected. The system control unit 218 switches between display (display state) and non-display (non-display state) of the EVF 217 according to the state detected by the eye approach detector 118. More specifically, the system control unit 218 puts the EVF 217 into the non-display state in a case where the imaging standby state is set and the switching of the EVF 217 is set to automatic switching. The system control unit 218 puts the EVF 217 into a display state while the eye approach detector 118 detects the approach of the object.

The power control unit 225 includes a battery detecting circuit, a DC-DC converter, and a switching circuit that switches blocks to be energized, and detects information about a battery, such as whether or not a battery is installed, a battery type, and a remaining battery amount. The power control unit 225 controls the DC-DC converter based on the battery detection result and instruction from the system control unit 218, and supplies the necessary voltage to each component including the recording medium 228 for the required period. The power supply unit 226 is a primary battery such as an alkaline battery or a lithium battery, a secondary battery such as a NiCd battery, a NiMH battery or a Li battery, an AC adapter, or the like. The recording medium I/F 227 is an interface with the recording medium 228. The recording medium 228 is a memory card, a hard disk drive, or the like for recording captured images, and includes a semiconductor memory, a magnetic disk, or the like. The recording medium 228 may be detachably attached to the HMD 100 in this embodiment, but may be built in the HMD 100.

The operation unit 229 is an input unit that accepts an operation from the user, and is used to input a variety of instructions to the system control unit 218. The operation unit 229 includes a shutter button 101, a power switch 102, a mode switch 103, and another operation unit 230. The shutter button 101 includes a first shutter switch 231 and a second shutter switch 232. The first shutter switch 231 is turned on when the shutter button 101 is half-pressed (imaging preparation instruction), and generates a first shutter switch signal SW1. The system control unit 218 starts imaging preparation processing such as AF processing, AE processing, AWB processing, and EF processing in response to the first shutter switch signal SW1. The second shutter switch 232 is turned on when the operation of the shutter button 101 is completed, that is, when the shutter button 101 is fully pressed (imaging instruction), and generates a second shutter switch signal SW2. The system control unit 218 starts a series of imaging processing from signal reading from the imaging unit 211 to generating an image file including a captured image and writing it into the recording medium 228 in response to the second shutter switch signal SW2. The mode switch 103 is used to switch the operation mode of the system control unit 218 among an imaging/display mode, a playback mode, an AR display mode, and the like. The user may use the mode switch 103 and directly switches the system control unit 218 among the above operating modes. Alternatively, after once confirming the display of an operation mode list screen by the mode switch 103, the user may selectively switch the operation mode among the plurality of displayed modes using the operation unit 229. The other operation unit 230 includes an electronic dial, direction keys, menu buttons, and the like.

Figure 2:
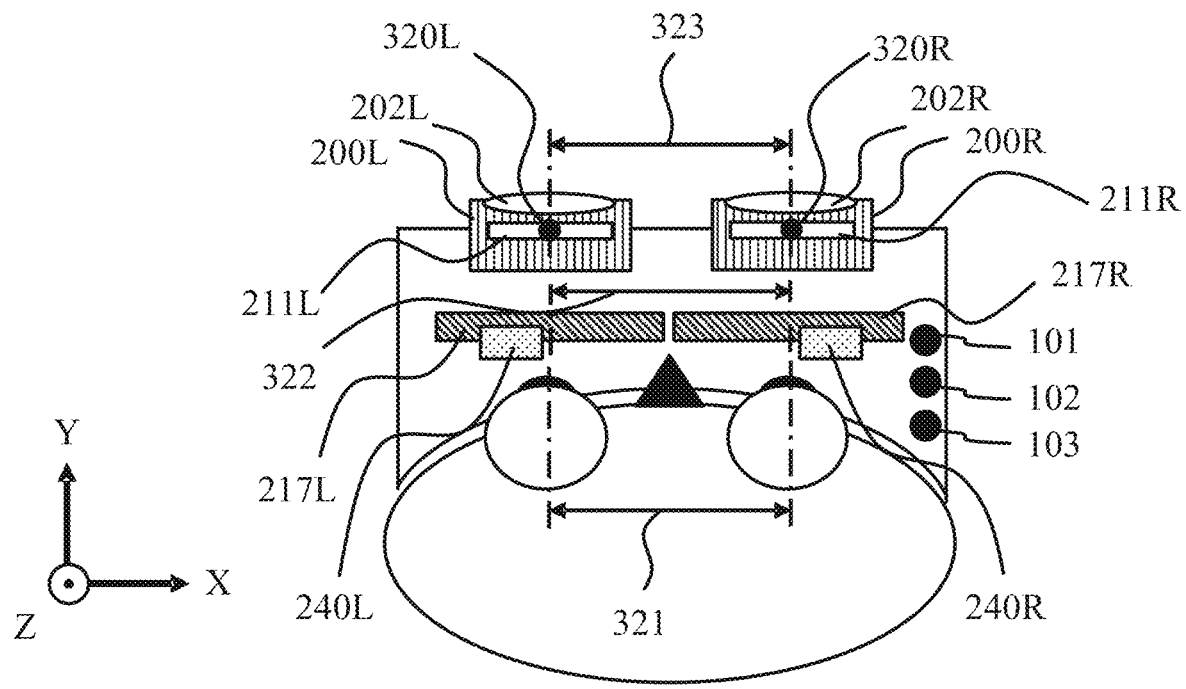
FIG. 2 schematically illustrates a configuration example of a user wearing the HMD.

FIG. 2 schematically illustrates an example of a user wearing the HMD 100. In FIG. 2, the configurations labelled with R and L are for the right eye and the left eye, respectively.

The right-eye imaging/display unit 250R includes an image capturing unit 200R, an EVF 217R, and an eyeball information acquiring unit 240R. The left-eye imaging/display unit 250L includes an image capturing unit 200L, an EVF 217L, and an eyeball information acquiring unit 240L.

The image capturing unit 200R includes a lens 202R and an imaging unit 211R. The image capturing unit 200L includes a lens 202L and an imaging unit 211L. The lenses 202R and 202L are arranged so that they have a parallax relative to each other. The imaging unit 211R receives a light beam that has passed through the lens 202R. The imaging unit 211L receives a light beam that has passed through the lens 202L.

Each of rotation adjusters 320R and 320L rotates in a yaw direction about the Z-axis and adjusts a convergence angle of a captured image. An EVF distance 322 is a distance between the EVF 217R and the EVF 217L and is variable by an unillustrated adjusting mechanism. Since a human eyeball distance 321, which is a distance between rotation centers of the left and right eyeballs, varies from person to person, an imaging unit distance 323 of the HMD 100, which is a distance between the right-eye imaging/display unit 250R and the left-eye imaging/display unit 250L, may also be adjustable. In this embodiment, the imaging unit distance 323 is variable by an unillustrated adjusting mechanism. The rotation adjusters 320R and 320L always maintain the imaging unit distance 323 and have a configuration that simulates the human eyeball center.

Configuration of Image Sensor

Figure 3:
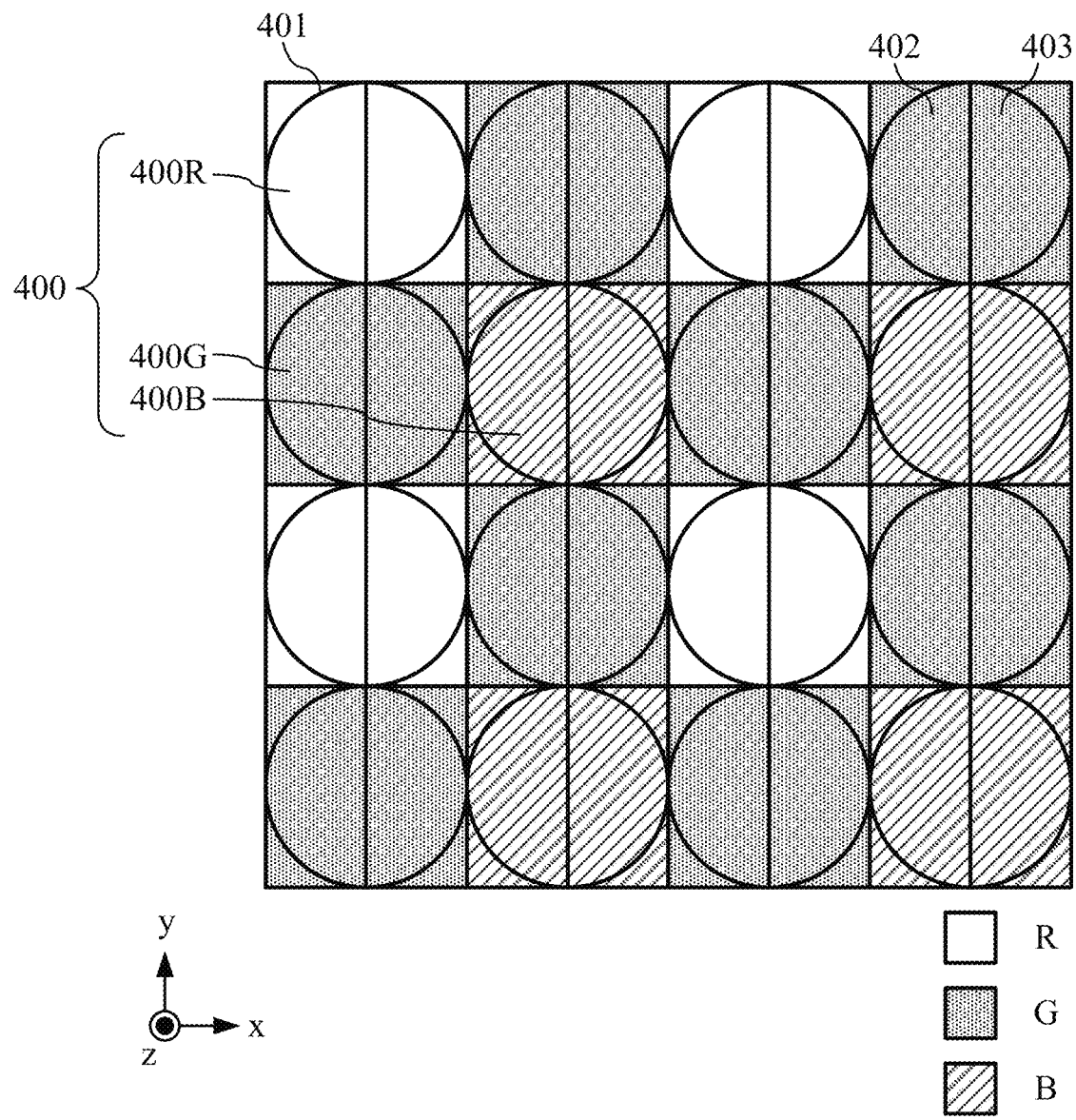
FIG. 3 schematically illustrates a pixel array example of an image sensor.

FIG. 3 schematically illustrates a pixel array example of the image sensor in the imaging unit 211, and illustrates the pixel array of the two-dimensional CMOS sensor as the image sensor in a range of 4 columns×4 rows of imaging pixels (which corresponds to a range of 8 columns×4 rows as an array of focus detecting pixels).

In this embodiment, it is assumed that the pixel unit 400 consists of 2 columns×2 rows of pixels and is covered with a Bayer array color filter. In the pixel unit 400, a pixel 400R having R (red) spectral sensitivity is located at the upper left position, a pixel 400G having G (green) spectral sensitivity is located at the upper right and lower left positions, and a pixel 400B having B (blue) spectral sensitivity is located at the lower right position. In order for the image sensor in the imaging unit 211 to perform focus detection using the imaging-plane phase-difference method, each pixel has a plurality of photodiodes (photoelectric conversion units) for a single microlens 401. In this embodiment, each pixel includes a first photodiode 402 and a second photodiode 403 arranged in 2 columns×1 row.

The image sensor in the imaging unit 211 enables an imaging signal and a focus detecting signal to be acquired by arranging a large number of pixel units 400 on the imaging plane each consisting of 2 columns×2 rows of pixels (4 columns×2 rows of photodiodes) illustrated in FIG. 3. In each pixel having such a configuration, a light beam is separated by the microlens 401 and images are formed on the first photodiode 402 and the second photodiode 403. A signal (A+B signal) obtained by adding the signals from the two photodiodes is used as an imaging signal, and a pair of focus detecting signals (A image signal and B image signal) read out of each photodiode are used as focusing signals.

The imaging signal and the focusing signals may be separately read out, but in consideration of the processing load, the imaging signal (A+B signal) and one of the focusing signals (for example, the A image signal) may be read out and the other focusing signal (for example, the B image signal) may be obtained by calculating a difference.

In this embodiment, each pixel is configured to have two photodiodes for the single microlens 401, but the number of photodiodes may be two or more.

The image sensor in the imaging unit 211 may have a plurality of pixels with different opening positions of the light receiving portion for the microlens 401. That is, any configuration may be used as long as the image sensor in the imaging unit 211 may acquire two signals for the phase difference detection, such as an A image signal and a B image signal, for detecting a phase difference.

Although FIG. 3 illustrates a configuration in which all pixels have a plurality of photodiodes, the disclosure is not limited to this example. The focus detecting pixels may be discretely provided.

Relationship Between Defocus Amount and Image Shift Amount

A description will now be given of a relationship between a defocus amount and an image shift amount calculated from a pair of focus detecting signals (A image signal and B image signal) acquired by the image sensor according to this embodiment. The following description assumes that an imaging center and the center of the optical axis coincide with each other. In addition, it is assumed that the defocus amount is calculated only by the right-eye imaging/display unit 250R, and distance information is calculated from the defocus amount. However, depending on a purpose, a defocus amount may be calculated with each of the right-eye imaging/display unit 250R and the left-eye imaging/display unit 250L, and the distance information may be calculated by combining the calculated defocus amounts. In this embodiment, the same image sensor is incorporated in each of the right-eye imaging/display unit 250R and the left-eye imaging/display unit 250L. Alternatively, an image sensor capable of calculating the defocus amount may be incorporated in only one of the right-eye imaging/display unit 250R and the left-eye imaging/display unit 250L. The distance information acquiring method is not limited to the one described in this embodiment.

Figure 4:
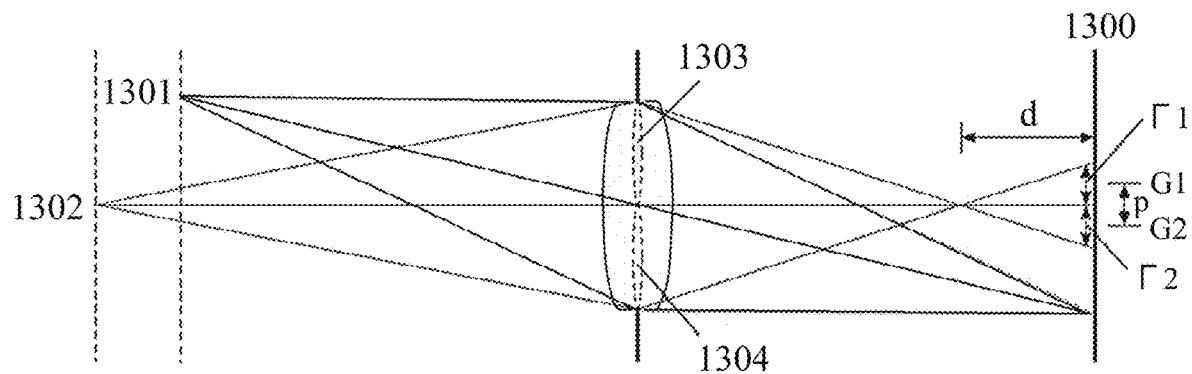
FIG. 4 schematically illustrates a relationship between a defocus amount and an image shift amount between a pair of focus detecting signals.

FIG. 4 schematically illustrates a relationship between a defocus amount d and an image shift amount between a pair of focus detecting signals (A image signal and B image signal). An image sensor (not shown) according to this embodiment is disposed on an imaging plane 1300, and an exit pupil of the imaging optical system is divided into a first pupil partial area 1303 through which a first light beam passes and a second pupil partial area 1304 through which a second light beam passes.

The defocus amount d is a distance from the imaging position of the object to the imaging plane 1300. Assume that is the magnitude of the defocus amount d. The defocus amount d is negative ($d<0$) in a case where the object is in a front focus state where the imaging position of the object is closer to the object than the imaging plane 1300, and is positive ($d>0$) in a case where the object is in a rear focus state where the imaging position of the object is on the opposite side of the object from the imaging plane 1300. In an in-focus state in which the imaging position of the object is on the imaging plane 1300, the defocus amount d is 0. In FIG. 4, an imaging position of an object 1301 is located at the imaging plane 1300 ($d=0$), and an imaging position of an object 1302 is located closer to the object than the imaging plane 1300 ($d<0$). The front focus state ($d<0$) and the rear focus state ($d>0$) will be collectively referred to as a defocus state ($|d|>0$).

In the front focus state ($d<0$), one of the light beams from the object 1302, which has passed through a first pupil partial area 1303 (second pupil partial area 1304) is once condensed, then spreads over a width Γ1 (Γ2) around a center-of-gravity position G1 (G2) of the light beam as a center, and forms a blurred image on the imaging plane 1300. The blurred image is received by the first photodiode 402 (second photodiode 403) in FIG. 3, and a pair of focus detecting signals (A image signal and B image signal) are recorded as an object image at the center-of-gravity position G1 (G2) on the imaging plane 1300 in which the object 1302 is blurred by the blur width Γ1 (Γ2). The blur width Γ1 (Γ2) approximately proportionally increases as the magnitude of the defocus amount d increases. Similarly, the magnitude of the image shift amount p of the object image between the pair of focus detecting signals (=difference G1−G2 in the center-of-gravity position of the light beam) also approximately proportionally increases as the magnitude |d| of the defocus amount d increases. This is similarly applied to the rear focus state ($d>0$), although the image shift direction of an object image between a pair of focus detecting signals is opposite to that of the front focus state.

Therefore, this embodiment can calculate the defocus amount d using the image shift amount p and the conversion coefficient K for converting the image shift amount p into the defocus amount d. The conversion coefficient K depends on the incident angle, the F-number, and the optical axis position of the imaging optical system.

Change in Focus Detection Acquiring Range According to Luminance in Imaging Environment In order to obtain good focus detection results while a stereoscopic image is displayed, a description will be given of a method of changing a focus detection acquiring range according to the luminance in the imaging environment. This embodiment divides the imaging environment into four cases, Case 1 to Case 4, for description purposes, but the number of cases is not limited to this example.

Figure 5:
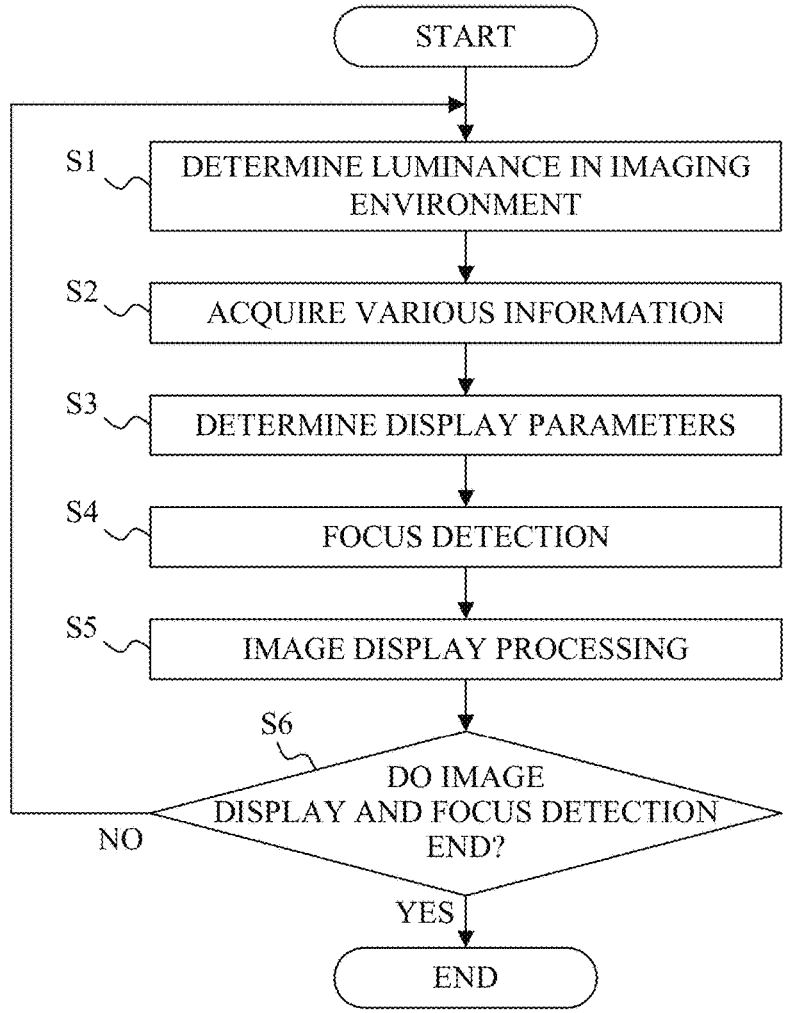
FIG. 5 is a flowchart illustrating a method of changing acquiring range for focus detection according to the luminance in the imaging environment.
Figure 6A:
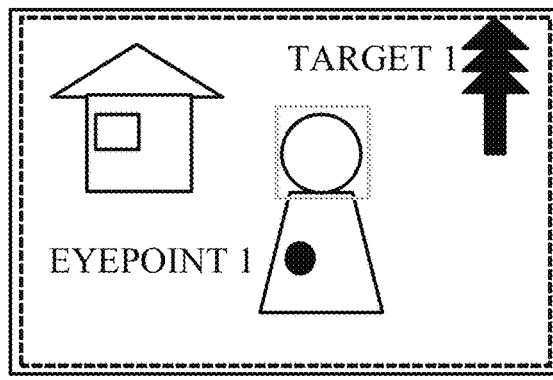
FIGS. 6A to 6D schematically illustrate changes in a focus detection acquiring range according to the luminance in the imaging environment.
Figure 6B:
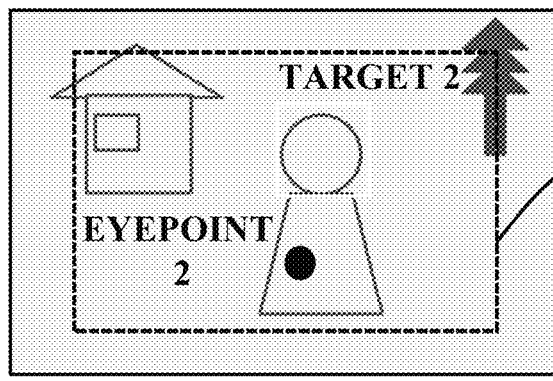
Figure 6C:
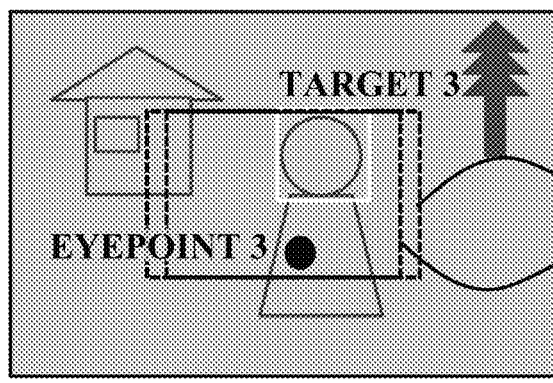
Figure 6D:
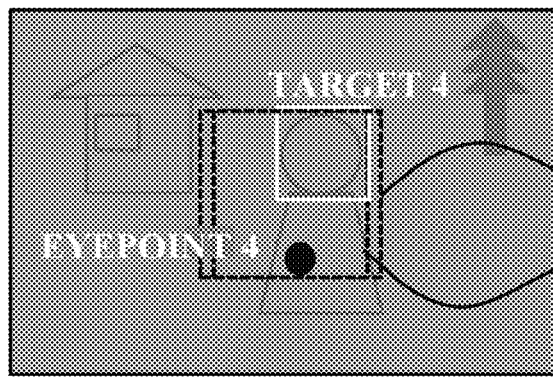

FIG. 5 is a flowchart illustrating the method of changing the focus detection acquiring range according to the luminance in the imaging environment according to this embodiment.

In step S1, the system control unit 218 determines the luminance in the imaging environment using a result of the AE processing. Although the luminance in the imaging environment is determined based on the result of the AE processing in this embodiment, it may be performed based on image data of the image processing unit 214.

FIGS. 6A to 6D schematically illustrate changes in the focus detection acquiring range according to the luminance in the imaging environment. Case 1 in FIG. 6A has the brightest imaging environment in which a high frame rate (FR) and high-speed sensor readout are available to acquire images necessary for three-dimensional image processing, and a wide signal acquiring range (Area 1) can be set for focus detection. Case 2 in FIG. 6B has a relatively bright imaging environment in which a high FR to an intermediate FR and high-speed to intermediate-speed sensor readout are available to acquire images necessary for three-dimensional image processing, and an intermediate signal acquiring range (Area 2) can be set for focus detection. Case 3 in FIG. 6C has a relatively dark imaging environment in which an intermediate FR and intermediate-speed sensor readout are available to acquire images necessary for three-dimensional image processing, and a narrow signal acquiring range (Areas 3R and 3L) can be set for focus detection. Case 4 in FIG. 6D has the darkest imaging environment in which an intermediate FR to a low FR and low-speed sensor readout are available to acquire images necessary for three-dimensional image processing, and a narrow signal acquiring range (Areas 4R and 4L) can be set for focus detection.

In step S2 (acquiring step), the system control unit 218 acquires various types of information necessary for the subsequent flows using the luminance in the imaging environment determined in step S1.

A description will be given of a case where it is determined in step S1 that the luminance in the imaging environment is that of the brightest imaging environment of Case 1. The system control unit 218 sets the focus detection acquiring range (first acquiring range) on the imaging plane of the image sensor in the imaging unit 211R and the focus detection acquiring range (second acquiring range) on the imaging plane of the image sensor in the imaging unit 211L to Area 1. Since Area 1 has a wide range, the imaging units 211R and 211L do not need to change the positions and sizes of the acquiring ranges. Since Case 1 is the brightest imaging environment, focus detection can be performed by acquiring focus detecting signals from the entire screen (image) in a short accumulation time. The system control unit 218 also functions as an object detector that detects a main object using a signal from at least one of the imaging units 211R and 211L, and acquires type information and position information in the screen of the main object by detecting main object information Target 1. The focus detection result near the main object information Target 1 in Area 1 is used for the subsequent focus detection. The system control unit 218 also acquires a target area for the user based on visual line information Eyepoint 1 of the user. The system control unit 218 may determine that the user is paying attention to the main object based on the main object information Target 1 and the target area, and use the focus detection result near the target area for the subsequent focus detection.

A description will now be given of a case where it is determined in step S1 that the luminance in the imaging environment is that of a relatively bright imaging environment of Case 2. More specifically, in this case, the luminance in the imaging environment is determined to be smaller than a first predetermined value. Since Case 2 has an imaging environment darker than that of Case 1, the accumulation time is longer than that for Case 1. The system control unit 218 sets a focus detection acquiring range on the imaging plane of the image sensor in the imaging unit 211R and a focus detection acquiring range on the imaging plane of the image sensor in the imaging unit 211L to Area 2 that is narrower than Area 1. Since Area 2 is relatively wide, the imaging units 211R and 211L do not need to change the positions and sizes of the acquiring ranges. The system control unit 218 acquires type information, position information in the screen, and the like of the main object by detecting the main object information Target 2. The focus detection result near the main object information Target 2 in Area 2 is used for the subsequent focus detection. The system control unit 218 also acquires a target area for the user based on visual line information Eyepoint 2 of the user. The system control unit 218 may determine that the user is paying attention to the main object based on the main object information Target 2 and the target area, and use the focus detection result near the target area for in the subsequent focus detection.

A description will now be given of a case where it is determined in step S1 that the luminance in the imaging environment is that of a relatively dark imaging environment of Case 3. More specifically, in this case, the luminance in the imaging environment is determined to be smaller than a second predetermined value. The second predetermined value is smaller than the first predetermined value. Since Case 3 has an imaging environment darker than that of Case 2, the accumulation time is longer than that for Case 2. The system control unit 218 sets a focus detection acquiring range on the imaging plane of the image sensor in the imaging unit 211R to Area 3R (third acquiring range) that is narrower than a predetermined range. The system control unit 218 sets a focus detection acquiring range on the imaging plane of the image sensor in the imaging unit 211L to Area 3L (fourth acquiring range) that is narrower than a predetermined range. Areas 3R and 3L are set to the centers of the optical axes of the EVFs 217R and 217L, respectively. The positions of Areas 3R and 3L are shifted on the imaging units 211R and 211L. The position and range of the acquiring range may be changed from the target area for the user based on the main object information Target 3 and visual line information Eyepoint 3 of the user.

Referring now to FIGS. 7A to 7C, a description will be given of a method for changing the position and range of the acquiring range. FIGS. 7A to 7C explain the method of changing the position and range of the focus detection acquiring range according to the luminance in the imaging environment, and illustrate the method of changing the positions and ranges of Areas 3R and 3L in a case where the imaging environment is Case 3.

FIG. 7A illustrates a state in which Areas 3R and 3L are set near the center of the screen. FIG. 7B illustrates a state in which the visual line information Eyepoint 3 of the user and an acquisition movable range (MoveaArea) are added to the state of FIG. 7A. After the target area is detected, Areas 3R and 3L are moved within the acquisition movable range (MoveArea) around the position of the target area as a center. Thereby, the minimum necessary range can be set.

FIG. 7C illustrates a state in which the main object information Target 3 and the acquisition movable range (MoveArea) are added to the state of FIG. 7A. In FIG. 7C, after the target area is detected, Areas 3R and 3L are moved within the acquisition movable range (MoveArea) centering on the main object position. As illustrated in FIG. 7C, Areas 3R and 3L may be further narrowed from the main object information Target 3. Thereby, the minimum necessary range can be set.

A description will now be given of a case where it is determined in step S1 that the luminance in the imaging environment is that of the darkest imaging environment of Case 4. More specifically, in this case, the luminance in the imaging environment is determined to be smaller than a third predetermined value. The third predetermined value is smaller than the second predetermined value. Since Case 4 has an imaging environment darker than that of Case 3, the accumulation time is longer than that of Case 3. The system control unit 218 sets a focus detection acquiring range on the imaging plane of the image sensor in the imaging unit 211R to Area 4R (third acquiring range) that is narrower than a predetermined range. The system control unit 218 sets a focus detection acquiring range on the imaging plane of the image sensor in the imaging unit 211L to Area 4R (fourth acquiring range) that is narrower than a predetermined range. Areas 4R and 4L are set to the centers of the optical axes of the EVFs 217R and 217L, respectively. The positions of Areas 4R and 4L are shifted on the imaging units 211R and 211L. The position and range of the acquiring range may be changed from the target area for the user based on the main object information Target 4 and the visual line information about the user.

In step S3, the system control unit 218 determines display parameters for image data to be displayed on the EVF 217R and EVF 217L according to the accumulation time acquired in step S2. This embodiment usually displays a three-dimensional stereoscopic image by causing the EVFs 217R and 217L to display different images. At the same time, focus detection is performed using a signal from the focus detection acquiring range on the imaging plane of the image sensor in each of the imaging units 211R and 211L. Focus detection may be performed using a signal from the focus detection acquiring range on the imaging plane of one of the image sensors in the imaging units 211R and 211L. Since the accumulation time approximately coincides between the display image signal acquisition and the focus detecting signal acquisition, high FR display and high-speed focus detection are available. However, especially in a dark imaging environment like Case 4, it may become difficult to maintain a high FR. In this case, the imaging unit 211R may acquire a display image signal, and output approximately the same image to the EVFs 217R and 217L to cause them to display a two-dimensional image. Alternatively, the imaging unit 211R may be caused to acquire a focus detecting signal and perform an operation for continuing image display and focus detection. Although the focus detection frequency decreases, focus detection may be performed using an added signal of several frames (signals obtained at a plurality of timings) in order to continue the stereoscopic display. In a case where the scene is so dark that focus detection is unavailable, focus detection may not be performed, and a display image indicating that focus detection is not performed may be generated and displayed.

In step S4 (detecting step), the system control unit 218 performs focus detection using the acquiring range acquired in step S2.

Figure 8:
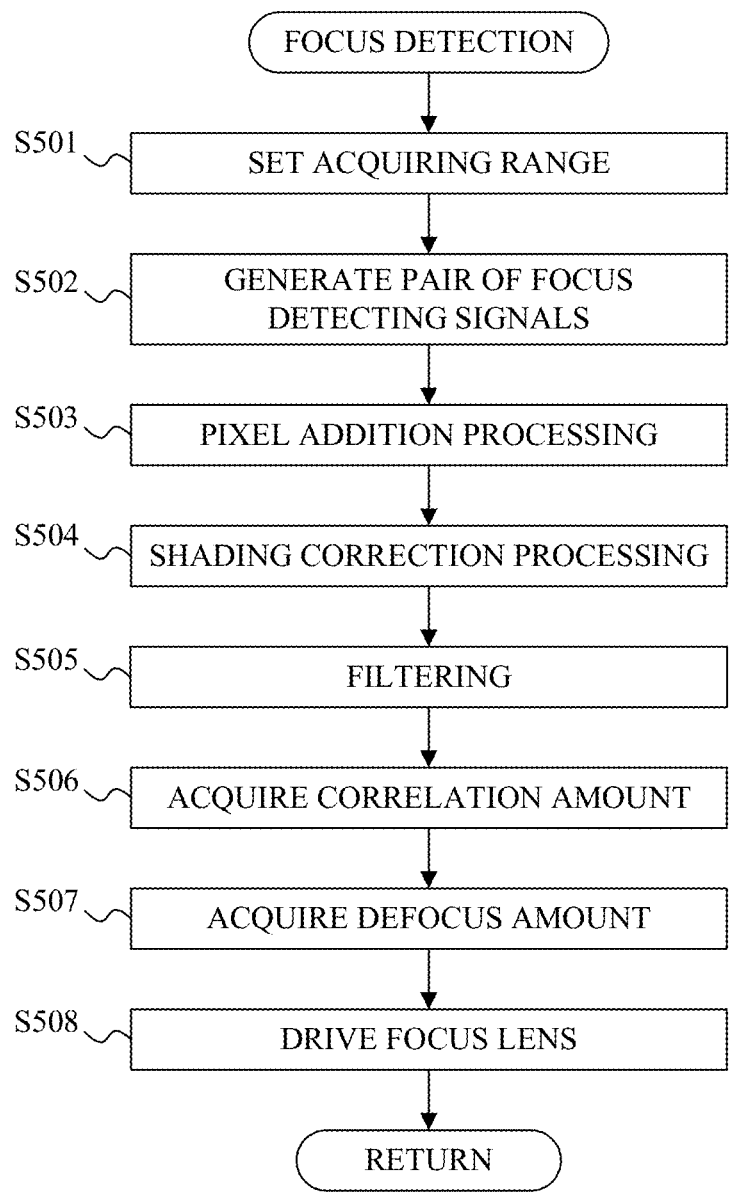
FIG. 8 is a flowchart illustrating a focus detecting method.

Referring now to FIG. 8, a description will be given of a focus detecting method. FIG. 8 is a flowchart illustrating the focus detecting method. The right-eye imaging/display unit 250R and the left-eye imaging/display unit 250L are different in focus position due to mechanical factors and the like, but there is no difference in the focus detecting method. Therefore, the focus detecting method will be described without distinction between the right-eye imaging/display unit 250R and the left-eye imaging/display unit 250L.

In this embodiment, the first focus detecting signal is read out of the first photodiode 402 of each pixel of the image sensor in FIG. 3, and the second focus detecting signal is read out of the second photodiode 403. More specifically, a signal Y as the first focus detecting signal and the second focus detecting signal is used by adding outputs of four pixels of green (G), red (R), blue (B), and green (G). In the phase difference AF, the defocus amount d is detected using the image shift amount p of the object image between the two focus detecting signals.

At step S501, the system control unit 218 sets the acquiring range obtained in step S2.

In step S502, the system control unit 218 acquires the first focus detecting signal from the first focus detecting pixel in the focus detection area and acquires the second focus detecting signal from the second focus detecting pixel in the focus detection area.

In step S503, the system control unit 218 performs pixel addition processing using the first focus detecting signal and the second focus detecting signal. Thereby, a signal data amount can be suppressed. More specifically, the system control unit 218 performs the pixel addition processing in the column direction, and performs RGB signal addition processing to generate the Y signal. In a case where the number of added pixels is 2, the pixel pitch becomes twice, so the Nyquist frequency is ½ as high as that in the non-addition state. In a case where the number of added pixels is 3, the pixel pitch becomes three times, so the Nyquist frequency is ⅓ as high as that in the non-addition state.

In step S504, the system control unit 218 performs shading correction processing (optical correction processing) for the first focus detecting signal and the second focus detecting signal. Thereby, intensities of the first focus detecting signal and the second focus detecting signal can coincide with each other. The shading correction value depends on the incident angle, F-number, and optical axis position of the imaging optical system.

In step S505, the system control unit 218 performs filtering using a bandpass filter for the first and second focus detecting signals. Thereby, the correlation (signal matching degree) between the first and second focus detecting signals and focus detecting accuracy are improved. Examples of the bandpass filter include a differential filter such as {1, 4, 4, 4, 0, −4, −4, −4, −1} that cuts DC components and extracts edges, and an additive filter such as {1, 2, 1} that suppresses high-frequency noise components.

In step S506, the system control unit 218 acquires a correlation amount representing the signal matching degree calculated by the shift processing for shifting the filtered first and second focus detecting signals relative to each other in the pupil dividing direction.

The correlation amount COR(s) is calculated by the following equation (1):

$$COR(s) = \sum_{k \in W} |A(k) - B(k-s)|, \quad s \in \Gamma \quad (1)$$

where A(k) is a filtered k-th first focus detecting signal, B(k) is a filtered k-th second focus detecting signal, W is a range of number k corresponding to the focus detecting area, s is a shift amount by the shift processing, and Γ is a shift range of the shift amount s.

If necessary, the correlation amount COR(s) calculated for each row may be added over a plurality of rows for each shift amount. In calculating COR(s), the reliability of the defocus amount in the latter stage can be evaluated based on a value such as a changing amount and peak and bottom values.

In step S507, the system control unit 218 acquires the defocus amount d obtained by multiplying the conversion coefficient K by the image shift amount p, which is the real-valued shift amount that minimizes the correlation amount acquired in step S506. The conversion coefficient K can be used to evaluate the reliability of the defocus amount.

In step S508, the system control unit 218 drives the focus lens using the lens drive amount converted from the defocus amount acquired in step S507.

In step S5 (generating step), the system control unit 218 performs image display processing using the image display parameters determined in step S3. In the image display processing, the system control unit 218 generates image data to be displayed on the EVFs 217R and 217L and displays the generated image data on the EVFs 217R and 217L.

Figure 9:
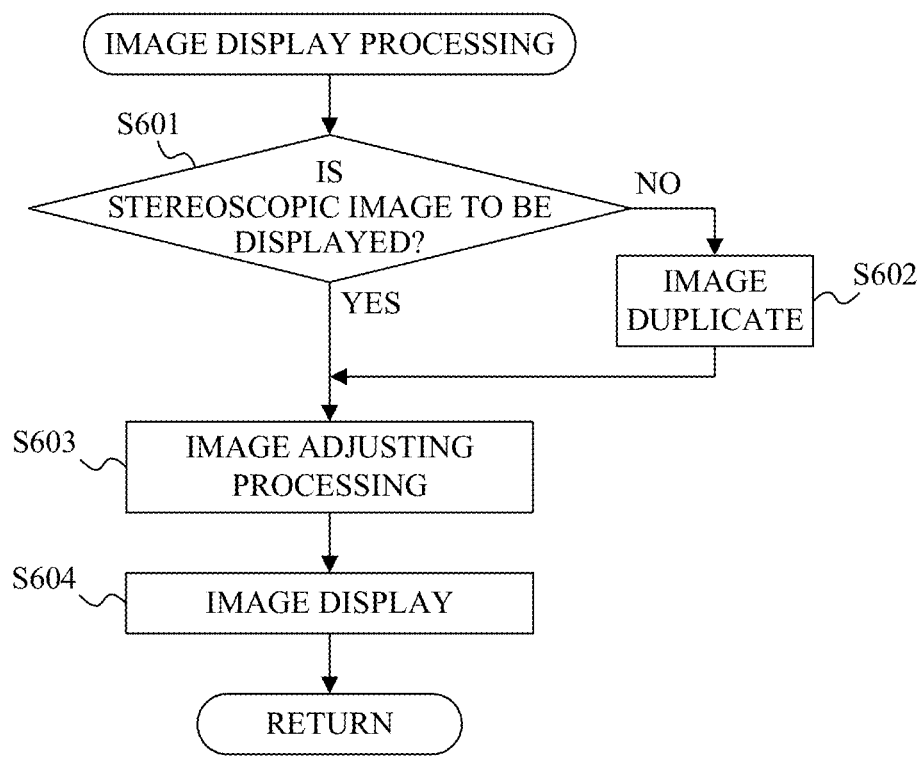
FIG. 9 is a flowchart illustrating an image display processing method.

Referring now to FIG. 9, a description will be given of an image display processing method. FIG. 9 is a flowchart illustrating the image display processing method.

In step S601, the system control unit 218 determines whether to display a stereoscopic image. In a case where it is determined that the stereoscopic image is to be displayed, the flow proceeds to step S603, and in a case where it is determined otherwise, that is, in a case where it is determined that a two-dimensional image is to be displayed, the flow proceeds to step S602.

In step S602, the system control unit 218 duplicates the image acquired by the imaging unit 211R or 211L. Images are displayed on the EVFs 217R and 217L.

In step S603, the system control unit 218 performs image adjusting processing for display on each image. In a case where it is determined in step S601 that the stereoscopic image is to be displayed, the adjusting processing is performed for the position and luminance of each image captured by the imaging unit 211R or 211L. In a case where it is determined in step S601 that a two-dimensional image is to be displayed, the adjusting processing is performed for the position and luminance of the image duplicated in step S602.

In step S604, the system control unit 218 causes each of the EVFs 217R and 217L to display the image obtained at step S603.

In step S6, the system control unit 218 determines whether to end image display and focus detection using a stop command of the user, power off of the HMD 100, and information from the eyeball information acquiring unit 240 or the eye approach detector 118. In a case where it is determined to end the image display and focus detection, this flow is terminated. Otherwise, the flow returns to step S1.

As described above, by changing the focus detection acquiring range according to the luminance in the imaging environment, the configuration according to this embodiment can properly perform image display and focus detection while suppressing deterioration of usability according to the luminance in the imaging environment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-019126, filed on Feb. 9, 2022, which is hereby incorporated by reference herein in its entirety.

What is claimed is:
1. A control apparatus comprising:
at least one processor; and
a memory coupled to the at least one processor, the memory having instructions that, when executed by the processor, perform operations as:
an acquiring unit configured to acquire a first signal acquired by a first image sensor that receives a light beam that has passed through a first optical system, and a second signal acquired by a second image sensor that receives a light beam that has passed through a second optical system disposed so that the first optical system and the second optical system have a parallax;

a focus detecting unit configured to perform focus detection using the first signal; and an image generating unit configured to generate a display image to be displayed on a display unit based on at least one of the first signal and the second signal, wherein the focus detecting unit changes a size of a first acquiring range of the first signal on an imaging plane of the first image sensor according to a luminance in an imaging environment.

2. The control apparatus according to claim 1, wherein as the luminance in the imaging environment becomes smaller, the focus detecting unit narrows the first acquiring range.

3. The control apparatus according to claim 1, wherein the focus detecting unit sets the first acquiring range using an object position detected by using at least one of the first signal and the second signal.

4. The control apparatus according to claim 1, wherein the focus detecting unit sets the first acquiring range using visual line information about a user.

5. The control apparatus according to claim 1, wherein the focus detecting unit changes a size of a second acquiring range of the second signal on an imaging plane of the second image sensor according to the luminance in the imaging environment.

6. The control apparatus according to claim 5, wherein as the luminance in the imaging environment becomes smaller, the focus detecting unit narrows the second acquiring range.

7. The control apparatus according to claim 5, wherein the focus detecting unit sets the second acquiring range using an object position detected by using at least one of the first signal and the second signal.

8. The control apparatus according to claim 5, wherein the focus detecting unit sets the second acquiring range using visual line information about a user.

9. The control apparatus according to claim 5, wherein in a case where the luminance in the imaging environment is smaller than a predetermined value, the focus detecting unit sets the first acquiring range to a third acquiring range narrower than a predetermined range, and sets the second acquiring range to a fourth acquiring range narrower than the predetermined range.

10. The control apparatus according to claim 9, wherein the third acquiring range is different from the fourth acquiring range.

11. The control apparatus according to claim 1, wherein the focus detecting unit performs the focus detection further using the second signal.

12. The control apparatus according to claim 9, wherein the image generating unit generates the display image using the second signal.

13. The control apparatus according to claim 9, wherein the first signal and the second signal are signals obtained by adding signals acquired at a plurality of timings, and wherein the image generating unit generates the display image using the first signal and the second signal.

14. The control apparatus according to claim 9, wherein in a case where the luminance in the imaging environment is smaller than the predetermined value, the focus detecting unit does not perform the focus detection and the image generating unit generates the display image indicating that the focus detection is not performed by the focus detecting unit.

15. An electronic apparatus comprising:

a first image sensor configured to receive a light beam that has passed through a first optical system;

a second image sensor configured to receive a light beam that has passed through a second optical system disposed so that the first optical system and the second optical system have a parallax; and a control apparatus that includes at least one processor, and a memory coupled to the at least one processor, the memory having instructions that, when executed by the processor, perform operations as:

an acquiring unit configured to acquire a first signal acquired by the first image sensor, and a second signal acquired by the second image sensor;

a focus detecting unit configured to perform focus detection using the first signal; and an image generating unit configured to generate a display image to be displayed on a display unit based on at least one of the first signal and the second signal, wherein the focus detecting unit a size of changes a first acquiring range of the first signal on an imaging plane of the first image sensor according to a luminance in an imaging environment.

16. A control method comprising:

an acquiring step configured to acquire a first signal acquired by a first image sensor that receives a light beam that has passed through a first optical system, and a second signal acquired by a second image sensor that receives a light beam that has passed through a second optical system disposed so that the first optical system and the second optical system have a parallax;

a detecting step configured to perform focus detection using the first signal; and a generating step configured to generate a display image to be displayed on a display unit based on at least one of the first signal and the second signal, wherein the detecting step changes a size of a first acquiring range of the first signal on an imaging plane of the first image sensor according to a luminance in an imaging environment.

17. A non-transitory computer-readable storage medium storing a computer program for causing a computer to execute the control method according to claim 16.

18. The control apparatus according to claim 1, wherein the processor further performs operations to determine the luminance in the imaging environment.

19. The control apparatus according to claim 1, wherein the processor performs operations to determine the luminance in the imaging environment based on a result of an AE (Auto Exposure) processing.

20. The control apparatus according to claim 1, wherein the processor performs operations to determine the luminance in the imaging environment based on acquired first image signal.

* * * * *